US009469134B2

(12) United States Patent
Aida

(10) Patent No.: US 9,469,134 B2
(45) Date of Patent: Oct. 18, 2016

(54) VENTILATION DEVICE, IMAGE FORMING APPARATUS, AND INFORMATION PROCESSING APPARATUS

(75) Inventor: Koji Aida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1183 days.

(21) Appl. No.: 13/458,165

(22) Filed: Apr. 27, 2012

(65) Prior Publication Data

US 2012/0276837 A1 Nov. 1, 2012

(30) Foreign Application Priority Data

Apr. 28, 2011 (JP) ................................ 2011-101653

(51) Int. Cl.

*F24F 7/00* (2006.01)
*B60H 1/34* (2006.01)
*B41J 29/377* (2006.01)

(52) U.S. Cl.

CPC .................................. *B41J 29/377* (2013.01)

(58) Field of Classification Search

CPC ...................................................... B41J 29/377
USPC ........................................................ 454/333
See application file for complete search history.

(56) References Cited

U.S. PATENT DOCUMENTS 7,497,772 B2 * 3/2009 Laib ..................... F16L 41/082 138/44

FOREIGN PATENT DOCUMENTS

| | | |
|---|---|---|
| JP | H0478871 A | 3/1992 |
| JP | 2002027361 A | 1/2002 |
| JP | 2006154137 A | 6/2006 |
| JP | 2007163685 A | 6/2007 |
| JP | A-2009-265288 | 11/2009 |

* cited by examiner

*Primary Examiner* — Helena Kosanovic
(74) *Attorney, Agent, or Firm* — Muncy, Geissler, Olds & Lowe, P.C.

(57) ABSTRACT

A ventilation device includes a ventilation part that includes a first engagement part and that allows air to flow therethrough, and an air-feeding direction change part that includes a second engagement part, that is revolvably attached to the ventilation part by engaging the first engagement part and the second engagement part, and that changes an air-feeding direction in accordance with revolving. The ventilation part includes a revolving center B and aperture parts. The air-feeding direction change part includes an oblique member disposed to incline with respect to a rotational axis of the air-feeding direction change part and a ventilation mouth part, the ventilation mouth part communicating with the aperture parts under a state where the air-feeding direction change part is attached to the ventilation part.

29 Claims, 12 Drawing Sheets

VENTILATION DEVICE, IMAGE FORMING APPARATUS, AND INFORMATION PROCESSING APPARATUS

CROSS REFERENCE TO RELATED APPLICATION

The present application is related to, claims priority from and incorporates by reference Japanese Patent Application No. 2011-101653, filed on Apr. 28, 2011.

TECHNICAL FIELD

The present application relates to a ventilation device, an image forming apparatus, and an information processing apparatus.

BACKGROUND

As image forming apparatuses as information processing apparatuses, printers, photocopy machines, facsimile machines, multifunction peripherals, and the like are known. Conventionally, a printer, for example, is configured to have a ventilation device disposed for blowing out the air that is in a printer main body (apparatus main body), and sucking air into the apparatus main body (see for example, JP Patent Laid-Open Application No. 2009-265288).

However, with the conventional ventilation device, it is impossible to set blow-out and suction directions in accordance with a printer arrangement state, the blow-out direction being a direction of blowing out the air that is in the apparatus main body, the suction direction being a direction of sucking air into the apparatus main body.

The objectives of the present application are to resolve such drawbacks of the conventional ventilation device and to provide a ventilation device, an image forming apparatus, and an information processing apparatus, the ventilation devices allowing to set the blow-out and suction directions of air in accordance with the arrangement state of the information processing apparatus.

SUMMARY

In order to achieve that, a ventilation device of the present application is provided with a ventilation part that includes a first engagement part and that allows air to flow therethrough; and an air-feeding direction change part that includes a second engagement part, that is revolvably attached to the ventilation part by engaging the first engagement part and the second engagement part, and that changes an air-feeding direction in accordance with its revolving.

The ventilation part includes a revolving center and a plurality of aperture parts, the revolving center being for revolvably attaching the air-feeding direction change part.

Also, the air-feeding direction change part includes an oblique member and a ventilation mouth part, the oblique member being disposed to incline with respect to a rotational axis of the air-feeding direction change part, the ventilation mouth part communicating with the aperture parts under a state where the air-feeding direction change part is attached to the ventilation part. With the structure, revolving the air-feeding direction change part allows to set blow-out direction and suction direction of air in accordance with an arrangement state of an information processing apparatus.

DETAILED DESCRIPTION OF EMBODIMENTS

Hereinafter, detail description of embodiments of the present application will be given with reference to the drawings. For this instance, descriptions will be given of an electrographic printer as an information processing apparatus and as an image forming apparatus.

Figure 2:
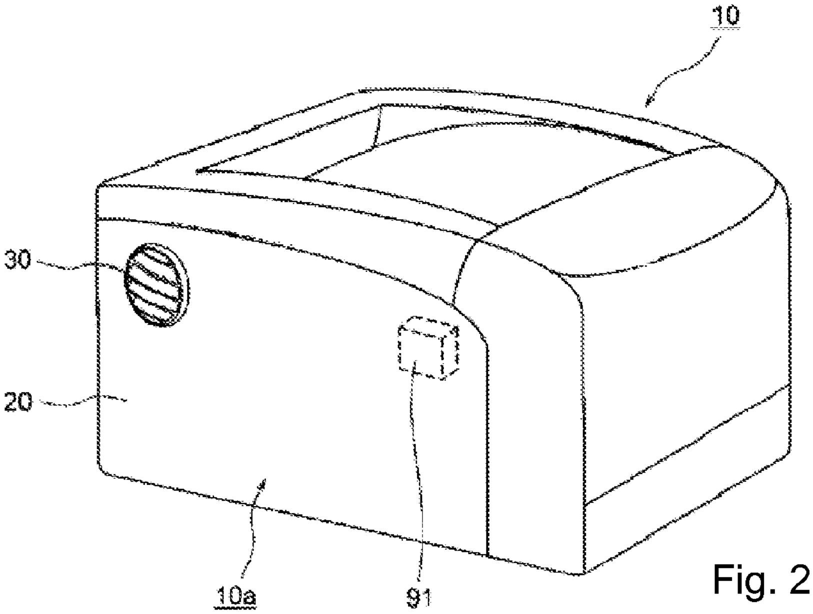
FIG. 2 is a perspective view of a printer according to the first embodiment of the present application.

FIG. 2 is a perspective view of a printer according to a first embodiment of the present application.

The figure illustrates a printer 10, a case 10*a* of a main body of the printer 10 (apparatus main body), and a controller 91 disposed in a predetermined portion in the case 10*a*.

In the printer 10, an image forming unit (not illustrated), a fuser (not illustrated) as a fuser device, and the like are disposed. A toner image formed in the image forming unit as a developer image transferred to a sheet as a medium is fixed in the fuser to the sheet, and then an image is formed. Then, the fuser is provided with a fuser roller and a backup roller. The fuser heats and melts the toner image using heat from a heating source disposed in the fuser roller, applies pressure with the backup roller, and fixes the toner image to the sheet.

When the temperature inside the apparatus main body is high due to heat generated by the fuser, the image forming unit and the fuser are not appropriately activated.

A fan (not illustrated in FIG. 2) as an air-feeding part is disposed at a predetermined position of the case 10*a*, the position in the present embodiment being on a back surface side (inside the apparatus main body) of an outer cover 20 covering a left side surface of the printer 10. A louver 30 as an air-feeding direction change part is disposed at a predetermined position of the case 10*a*, the position in the present embodiment being on a front surface side (outside of the apparatus main body) of the outer cover 20. The air that is in the apparatus main body is blown out of the apparatus main body by activating the fan. The ventilation device is configured with the outer cover 20, the louver 30, and the fan.

Next, descriptions will be given of the ventilation device.

Figure 1:
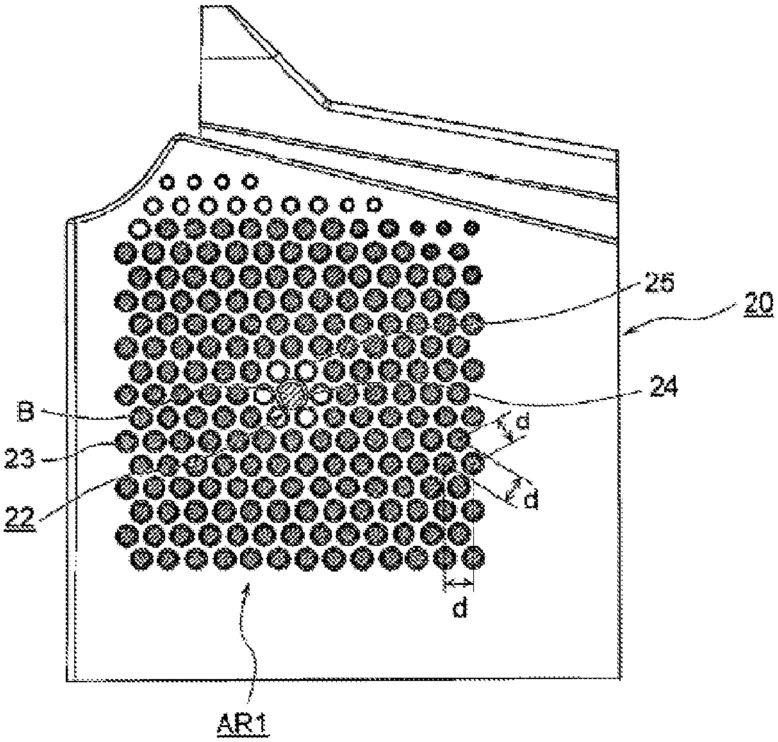
FIG. 1 is a front view of an outer cover according to a first embodiment of the present application.
Figure 3:
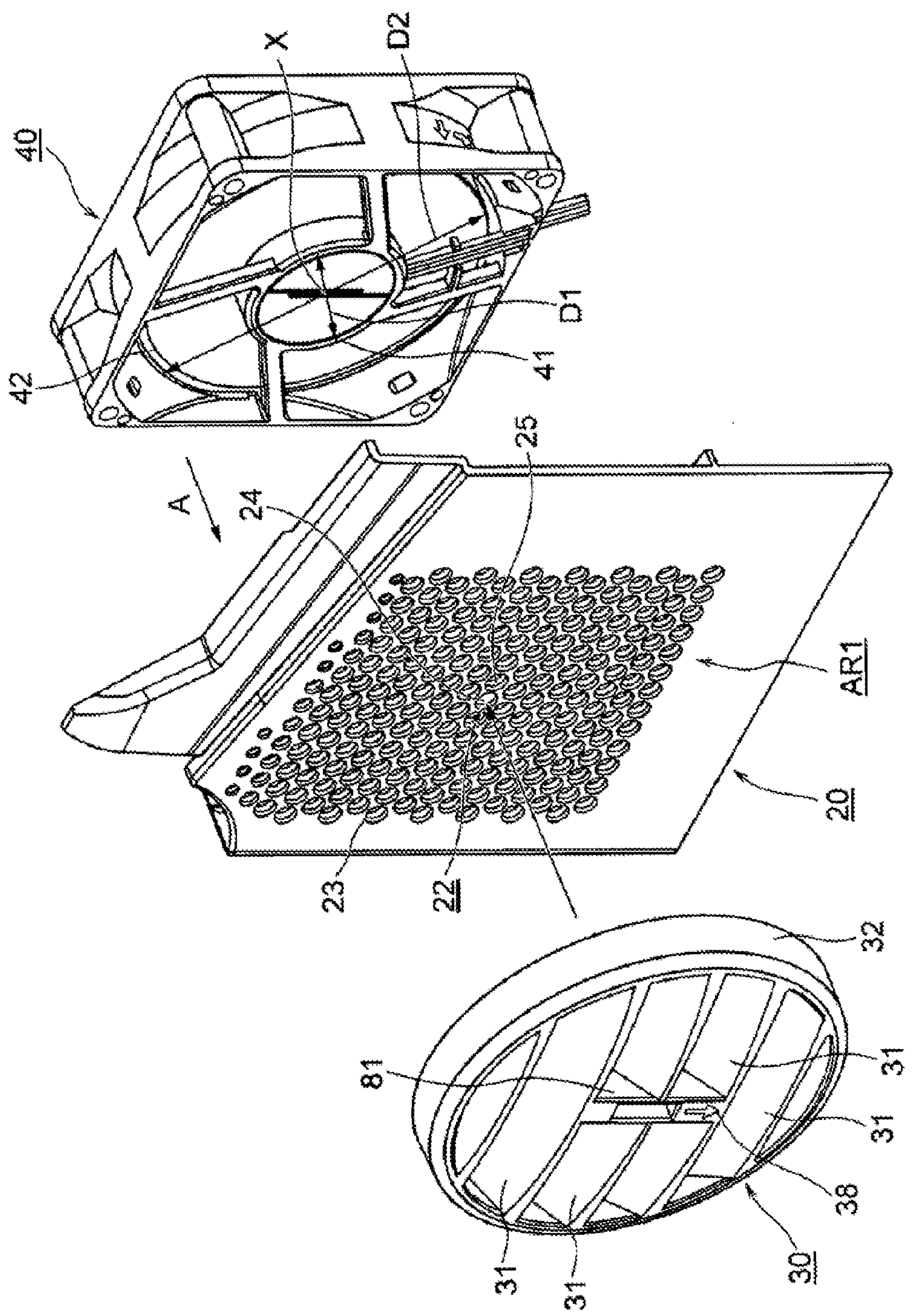
FIG. 3 is a first exploded perspective view of a ventilation device according to the first embodiment of the present application.
Figure 4:
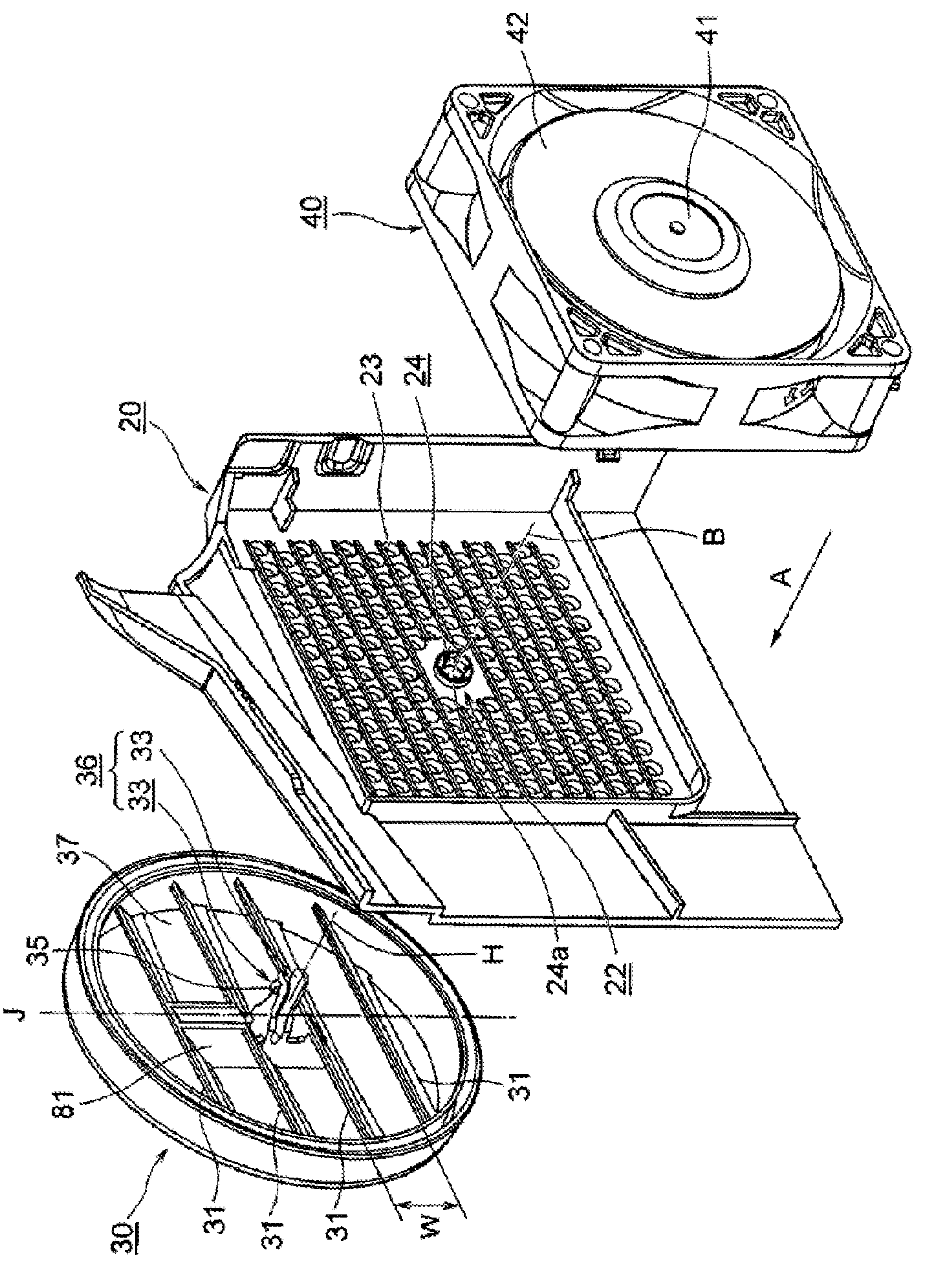
FIG. 4 is a second exploded perspective view of the ventilation device according to the first embodiment of the present application.
Figure 5:
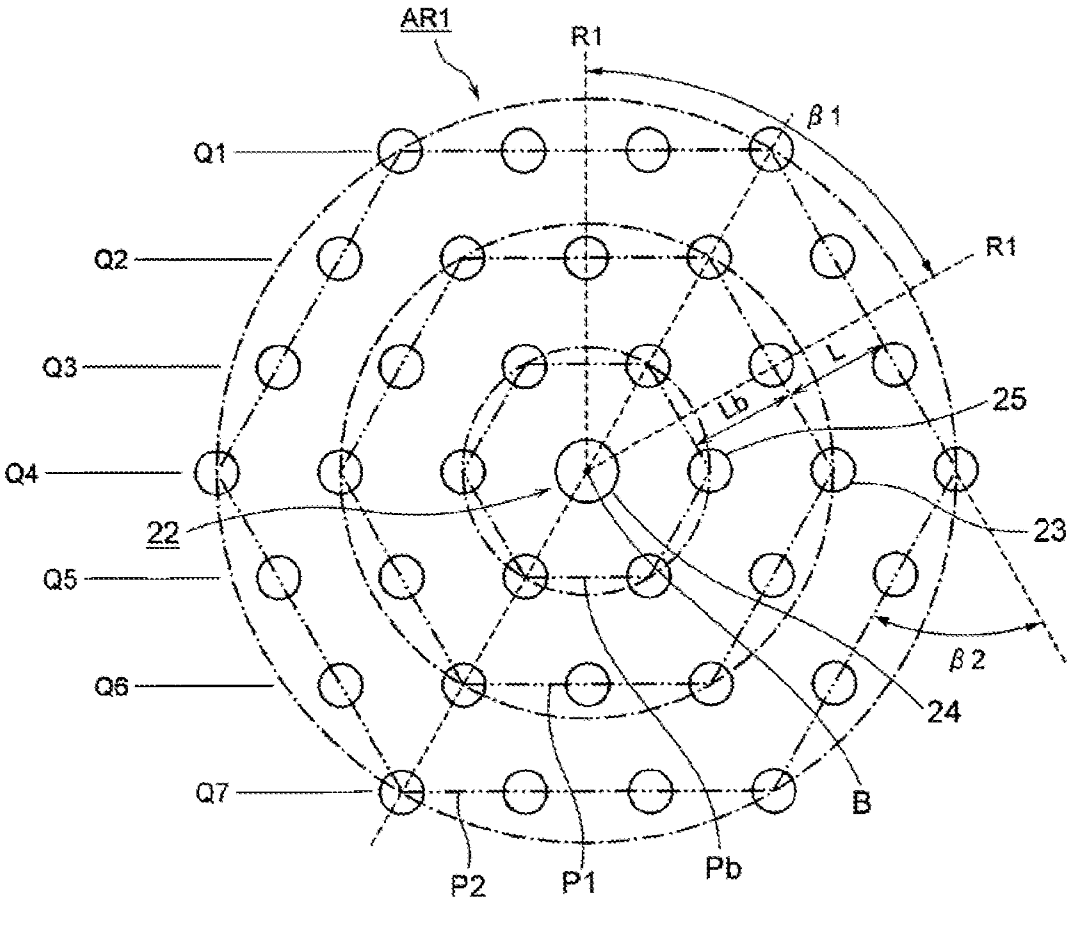
FIG. 5 is an enlarged view of an air-flow region according to the first embodiment of the present application.
Figure 6:
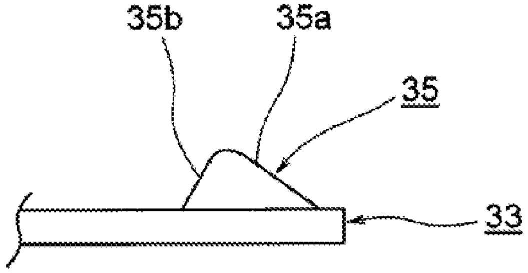
FIG. 6 is an enlarged view of a main part of an engagement latch according to the first embodiment of the present application.

FIG. 1 is a front view of the outer cover according to the first embodiment of the present application. FIG. 3 is a first exploded perspective view of the ventilation device according to the first embodiment of the present application. FIG. 4 is a second exploded perspective view of the ventilation device according to the first embodiment of the present application. FIG. 5 is an enlarged view of an air-flow region according to the first embodiment of the present application. FIG. 6 is an enlarged view of a main part of an engagement latch according to the first embodiment of the present application.

The figures illustrate the outer cover 20, the louver 30, and a fan 40.

An air-flow region AR1 is formed in the outer cover 20 for blowing the air that is in the apparatus main body out. The air-flow region AR1 as a ventilation part through which air flows has a predetermined shape, the shape being a nearly rectangular shape in the present embodiment. The fan 40 is disposed in the apparatus main body in the manner of facing the outer cover 20 and facing the air-flow region AR1, and the fan 40 is firmly attached to a frame (not illustrated) of the apparatus main body (a apparatus main body frame) disposed inside the outer cover 20 by screws (not illustrated) as a firmly attaching element. The fan 40 is activated in response to control signals received from the controller 91 and performs air-feeding.

Also, the louver 30 is disposed facing the fan 40 with the air-flow region AR1 interposed therebetween. Then, the louver 30 is removably and revolvably attached to the outer cover 20 such that the blow-out direction of the air that is in the apparatus main body can be changed, the direction being a ventilation direction and an air-feeding direction.

In the present embodiment, the fan 40 is firmly attached to the apparatus main body frame; however, may also be attached directly to the outer cover 20. Also, in the present embodiment, the ventilation device is disposed so as to blow the air that is in the apparatus main body out of the apparatus main body (in a direction A in FIG. 3). Alternatively, the ventilation device may be disposed to suck air into the inside of the apparatus main body. In such instance, the louver 30 is removably and revolvably attached to the outer cover 20 such that the suction direction of air into the inside of the apparatus main body can be changed, the direction being a ventilation direction and an air-feeding direction.

At the center of the air-flow region AR1, an attachment part 22 is formed as a first engagement part for positioning the louver 30 with respect to the outer cover 20 and for attaching the louver 30 to the outer cover 20. Then, at the attachment part 22, an attachment hole 24 penetrating through the outer cover 20 is formed. The attachment hole 24 sets a revolving center B for attaching the louver 30 revolvable to the outer cover 20. Also, around the attachment hole 24, in order to prevent incorrect attachment of the louver 30 to the outer cover 20, a plurality (six pieces in the present embodiment) of cavity parts 25 with a predetermined depth are formed without penetrating through the outer cover 20, the cavity parts 25 being as incorrect attachment prevention parts.

The cavity parts 25 form apexes and sides around the attachment hole 24 along sides of an imaginary polygon (regular polygon) with the revolving center B as the center, the polygon being a regular hexagon Pb in the present embodiment. Then, in order to allow blown-out air to flow through, a plurality of air-flow holes 23 are formed around the cavity parts 25, in a predetermined pattern and in the manner of penetrating through the outer cover 20, the air-flow holes 23 each being as an aperture part having a round shape. The air-flow holes 23 form apexes and sides along the sides of one or more of the imaginary polygons (regular polygons) having the revolving center B as the concentric center from the vicinity of the cavity parts 25 radially outwardly in the diameter direction, the polygons being a plurality of regular hexagons Pi (i=1, 2, . . . ) in the present embodiment. The air-flow holes 23 are formed such that the number of the air-flow holes 23 forming each side of each of the regular hexagons Pi increases by one compared with the number of the air-flow holes 23 forming a side of an inner adjacent regular hexagon Pi. The center of each cavity parts 25 is placed on the corresponding side of the regular hexagon Pb, and the center of each air-flow holes 23 is placed on the corresponding side of the regular hexagons Pi.

Also, the air-flow holes 23 are formed symmetrically about the perpendicular bisector R1 of the corresponding side of the regular hexagons Pi. Then, an angle β1 formed by two adjacent perpendicular bisectors R1 and an angle β2 formed by two adjacent sides, an angle β2 being an exterior angle of the regular hexagon Pi, are respectively 60°.

In the present embodiment, the regular hexagons Pb and Pi are set concentrically with respect to the revolving center B and at the predetermined pitch in a radial direction such that the sides become parallel to each other, and are set such that predetermined two sides facing each other extend horizontally. However, it is possible to set the regular hexagons Pb and Pi such that the predetermined two apexes facing each other are placed in the perpendicular direction. Then, a distance Lb between sides of the regular hexagons Pb and P1 and a distance L between sides of the regular hexagons Pi are the same and are set as follows:

$$\begin{aligned} Lb &= L \\ &\approx 5.2\ \text{mm.} \end{aligned}$$

Also, in the present embodiment, the diameter of each of the air-flow holes 23 is set at 4 mm, and the diameter of the attachment hole 24 is set to be larger than the diameter of each of the air-flow holes 23.

Each of the air-flow holes 23 has six adjacent air-flow holes 23 in hexagonal directions respectively differed by 60° around the air-flow hole 23. one of the air-flow holes 23 forms imaginary triangles (regular triangles in the present embodiment) with two of the adjacent air-flow holes 23 that are differed by 60° in the hexagonal directions. Distances between two of adjacent air-flow holes 23 in the hexagonal directions are substantially the same and are set at 6 mm.

Also, the air-flow holes 23 form a plurality of air-flow hole rows Qj (j=1, 2, . . . ) that extend in the horizontal direction and in parallel to each other. In each air-flow hole row Qj, the air-flow holes 23 are arrayed at a pitch d:

d=6 mm.

The horizontal positions of the air-flow holes 23 on an air-flow hole row Qj are offset (shifted) by a predetermined distance from the horizontal positions of the air-flow holes 23 on an adjacent air-flow hole row Qj. The predetermined distance in the present embodiment is a half of the pitch d.

In the present embodiment, the cavity parts 25 are formed as incorrect attachment prevention parts; however, a plane portion may be formed as the incorrect attachment prevention part where neither air-flow hole 23 nor cavity part 25 is formed around the attachment hole 24.

As illustrated in FIG. 3, the center of the fan 40 is X, the outer diameter of a bearing part 41 of the fan 40 is D1, and the outer diameter of a blade 42 of the fan 40 is D2. At a region (air-feeding region) where air-feeding from the portion distanced at the value D1/2 from the center X to the portion distanced at the value D2/2 from the center X is performed, the fan 40 forms a flow of air for blowing the air that is in the apparatus main body out through the air-flow holes 23. In the present embodiment, the cavity parts 25 are formed in a region (bearing region) that is within the portion from the center X to the portion distanced at the value D1/2, so that the air-feeding region is not shielded by the cavity parts 25 and therefore the air that is in the apparatus main body can be smoothly blown out.

The louver 30 has a round shape. The louver 30 is provided with a ring-shape body 32, a plurality of slats 31, and a linkage part 81, the ring-shape body 32 having a predetermined diameter and a predetermined thickness, the plurality of slats 31 as blades and as oblique members disposed in the ring-shape body 32 in parallel to each other in the manner inclined at a predetermined angle around an axis direction of the ring-shape body 32, the linkage part 81 extending in the direction forming a right angle with a plurality of the slats 31 (three slats 31 in the present embodiment) in the central portion of the louver 30 and being as a central base part linking the slats 31. Then, ventilation mouth parts 37 are formed between the slats 31 within the ring-shape body 32 by the slats 31, the ventilation mouth parts 37 being communicated with the air-flow holes 23 and being inclined at an angle the same as the angle of the slats 31. The ventilation mouth parts 37 are communicated with the air-flow holes 23 under the state where the louver 30 is attached to the outer cover 20. Therefore, air flowing through the air-flow holes 23 becomes oblique due to the slats 31 and flows in the inclined manner through the ventilation mouth parts 37.

The slats 31 and the ventilation mouth parts 37 extend in nearly parallel to a predetermined side of the regular hexagons Pi. Also, the slats 31 extend in the bilaterally symmetric manner about a reference axis J extending along the linkage part 81, and distances W between the slats 31 are substantially equal.

The linkage part 81 is formed by a board-shape body with a predetermined thickness and functions as a tab used for revolving the louver 30 by operators. Then, on the front side of the linkage part 81, a carved arrow shows an arrow 38 as an indicator of the inclined direction of air flowing through the ventilation mouth parts 37.

Also, on the back side of the linkage part 81, a shaft part 36 as a second engagement part is formed by attaching a pair of engagement latches 33 to extrude toward the outer cover 20 side, and the louver 30 can be removably attached to the outer cover 20 by engaging the engagement latches 33 and the attachment part 22.

Therefore, the engagement latches 33 are respectively formed in a thin tongue shape to have flexibility and in parallel to each other at a predetermined distance therebetween. In the vicinity of tip ends, lock parts 35 are formed to extrude toward the directions of separating from each other. Also, in the attachment part 22, a ring-shape lock part **24*a* is formed to extrude on the back side of the outer cover 20 along the internal circumference of the rim of the attachment hole 24**.

Therefore, the shaft part 36 is inserted into the attachment hole 24 by bending the engagement latches 33, and the engagement latches 33 and the attachment part 22 can be engaged by locking the lock parts 35 and the lock part **24*a***.

In each of the engagement latches 33, an inclined part **35*a* and an inclined part 35*b* are formed. The inclined part 35*a* is formed such that the engagement latch 33 easily bends during the insertion of the shaft part 36 into the attachment hole 24. The inclined part 35*b* is formed such that each of the engagement latches 33 easily bends during the taking-out of the shaft part 36 from the attachment hole 24**.

Then, the shaft part 36 functions as a rotational axis H of the louver 30, and the louver 30 can revolve around the shaft part 36 as the center after the louver 30 is attached to the outer cover 20.

As described above, in the present embodiment, the louver 30 is attached revolvably to the outer cover 20, the slats 31 are disposed inclined at a predetermined angle with respect to the rotational axis H of the louver 30, and the ventilation mouth parts 37 communicated with the air-flow holes 23 are formed. Therefore, operators can change the blow-out direction of air in accordance with the revolving angle of the louver 30 by holding the linkage part 81 and revolving the louver 30.

Therefore, it is possible to set the blow-out direction of air in accordance with the arrangement state of the printer 10.

Also, in the present embodiment, the louver 30 is removably disposed to the outer cover 20 and the blow-out direction of air is set; however, the blow-out function of air from the apparatus main body is not degraded even when the louver 30 is used in the manner detached from the outer cover 20.

Then, around the attachment hole 24, the cavity parts 25 are formed without penetrating through the outer cover 20, and therefore it is possible for operators to clearly identify the attachment hole 24. Therefore, operators can easily insert the shaft part 36 into the attachment hole 24, so that the louver 30 can easily be attached to the outer cover 20.

When the shaft part 36 is not properly inserted into the attachment hole 24, the shaft part 36 contacts the cavity parts 25, and further movement of the shaft part 36 is deterred. Therefore, incorrect attachment of the louver 30 to the outer cover 20 can be prevented.

Also, in the present embodiment, the air-flow holes 23 have the round shape so that the strength of the outer cover 20 is not degraded even when the air-flow holes 23 are closely formed along the sides of the regular hexagons Pi.

Upon a manufacturing process, it may be difficult to exactly set a pitch d between the air-flow holes 23 and the distances Lb, L and the like and to form the air-flow holes 23 to be accurately symmetric about the perpendicular bisector R1; however, the similar effect to the present embodiment can be obtained as long as the error is within ±20% with respect to the identical size, the identical arrangement, and the like.

In the present embodiment, the louver 30 is removably disposed to the outer cover 20, and therefore the printer 10 can be used in which the louver 30 is detached from the outer cover 20, the louver 30 deemed as an optional element.

In such case, around the attachment hole 24, the cavity parts 25 and the air-flow holes 23 are formed along the sides of the plurality of the regular hexagons Pi. Thereby, it is possible not only to blow the air that is in the apparatus main body out through the air flow holes 23 but also to obtain good appearance of the air-flow region AR1 of the outer cover 20.

In the present embodiment, the diameter of each of the air-flow holes 23 is set at 4 mm, as described above, so that finger tips of the operator do not directly touch the fan 40 when the printer 10 is used without the louver 30 being attached to the outer cover 20. In such case, it is preferred to set the diameter of each of the air-flow holes 23 at 8 mm setting the safety factor at 1.5 because the diameter of finger tips of 90 percentile (90 people out of 100 people) of adults is approximately 12 mm. However, in the present embodiment, the diameter of each of the air-flow holes 23 is set at 4 mm setting the safety factor at 3.0. Also, in the present embodiment, the air-flow holes 23 are configured to have a round shape; however, the air-flow holes 23 may also be configured to have any other shape than the round shape as long as the shape does not allow finger tips of operators to insert into the air-flow holes 23.

Next, descriptions of a second embodiment of the present application will be given. Elements having the same structure as the first embodiment are assigned with the same reference numbers, and effects of the present application obtained by the same structure are similar to the effects of the first embodiment.

Figure 7:
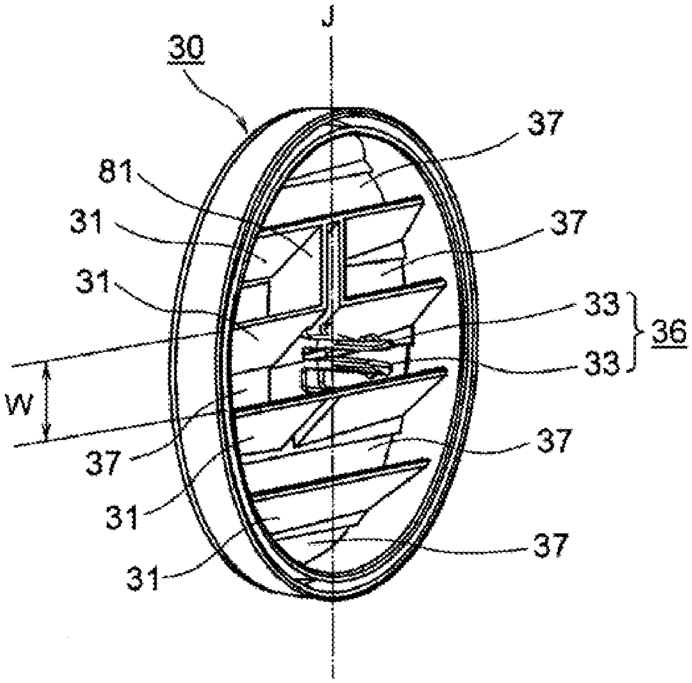
FIG. 7 is a perspective view of a louver according to a second embodiment of the present application.
Figure 8:
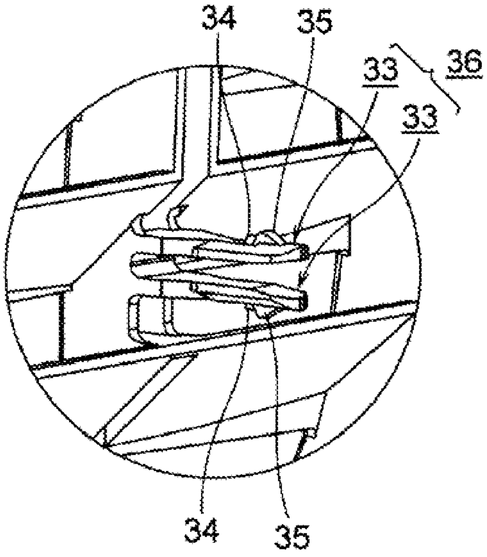
FIG. 8 is a perspective view of a main part of the louver according to the second embodiment of the present application.
Figure 9:
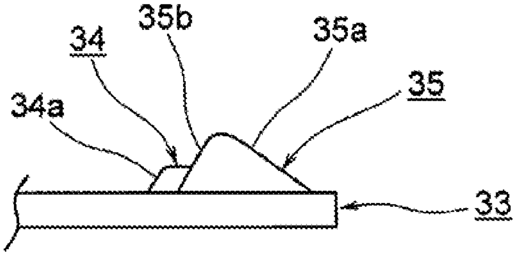
FIG. 9 is an enlarged view of a main part of an engagement latch according to the second embodiment of the present application.
Figure 10:
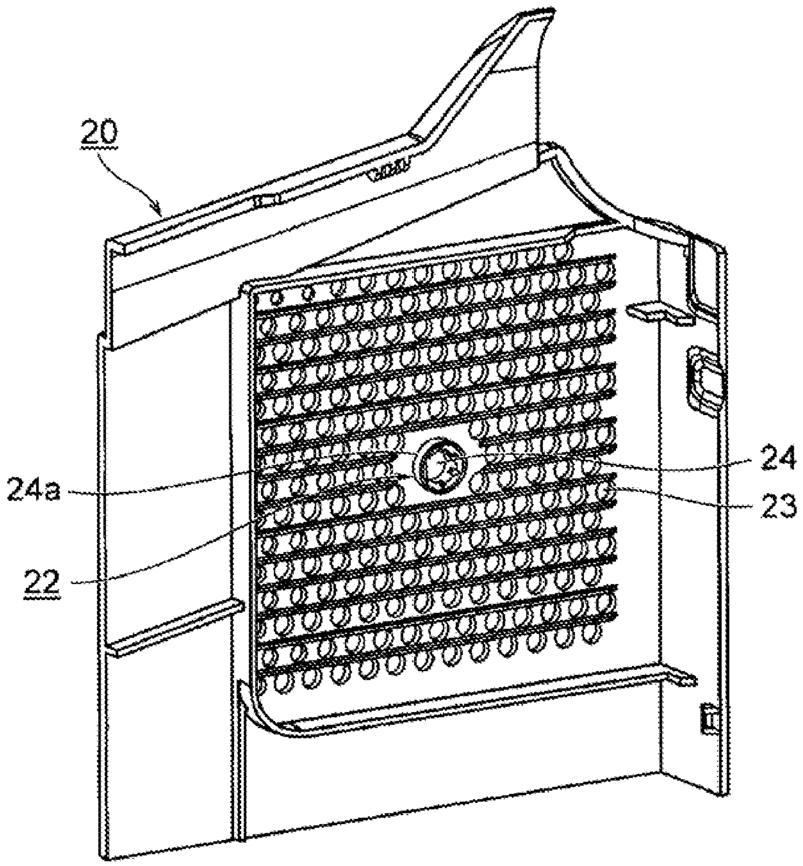
FIG. 10 is a perspective view of an outer cover according to the second embodiment of the present application.
Figure 11:
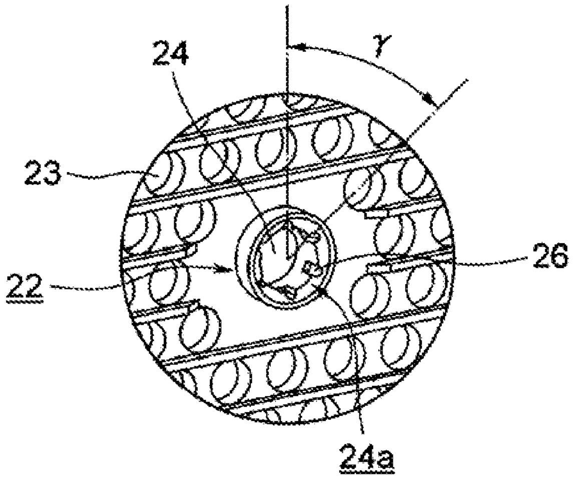
FIG. 11 is a perspective view of a main part of the outer cover according to the second embodiment of the present application.

FIG. 7 is a perspective view of a louver according to the second embodiment of the present application. FIG. 8 is a perspective view of a main part of the louver according to the second embodiment of the present application. FIG. 9 is an enlarged view of a main body of an engagement latch according to the second embodiment of the present application. FIG. 10 is a perspective view of an outer cover according to the second embodiment of the present application. FIG. 11 is a perspective view of a main body of the outer cover according to the second embodiment of the present application.

In such case, an attachment part 22 is formed as a first engagement part for positioning and attaching the louver 30 to the outer cover 20, and at the attachment part 22, one attachment hole 24 penetrating through the outer cover 20 is formed.

Also, in the louver 30, on the back side of the linkage part 81 as a central base part, a shaft part 36 as a second engagement part is formed by attaching a pair of engagement latches 33 to extrude, and the louver 30 can be removably attached to the outer cover 20 by engaging the engagement latches 33 and the attachment part 22.

Therefore, the engagement latches 33 are respectively formed in a thin tongue shape to have flexibility and in parallel to each other with a predetermined distance therebetween. In the vicinity of tip ends, lock parts 35 are formed to extrude toward the directions of separating from each other. Also, in the attachment part 22, a ring-shape lock part 24*a* is formed to extrude on the back side of the outer cover 20 along the internal circumference of the rim of the attachment hole 24.

Then, on the linkage part 81 side with respect to the lock part 35 in each of the engagement latches 33, a lock projection 34 is formed adjacent to the lock part 35 and projected from the engagement latch 33 toward the direction perpendicular to the plane along the rotational axis H. In a plurality of portions (six portions in the present embodiment) on an interior circumference plane of the engagement part 24*a*, lock notches 26 are formed at a predetermined pitch in the circumference direction and by a predetermined angle $\gamma$. In such case, a first positioning condition is configured by the lock notches 26, and a second positioning condition is configured by the lock projection 34.

The angle $\gamma$ is set in accordance with the pattern of the plurality of the air-flow holes 23 as an aperture part, and in the present embodiment, the air-flow holes 23 are formed along the sides of the regular hexagon Pi. Therefore, the angle $\gamma$ is set as follows:

$$\begin{aligned}\gamma &= 360/6\\ &= 60^\circ.\end{aligned}$$

In other words, as illustrated in FIG. 5, an exterior angle $\beta 2$ of the regular hexagon Pi is 60°, so that the angle $\gamma$ is set to be substantially the same as the exterior angle $\beta 2$ of the regular hexagon Pi.

Therefore, by bending the engagement latches 33 to insert the shaft part 36 into the attachment hole 24, revolving the louver 30, and approaching the lock projections 34 into the lock notches 26, the lock parts 35 and the lock part 24*a* can be locked by every revolving of a predetermined angle (by 60° in the present embodiment), and the engagement latches 33 and the attachment part 22 can be engaged at every revolving of a predetermined angle $\gamma$.

As a result, the louver 30 can be positioned to the outer cover 20 at a plurality of portions (six portions in the present embodiment) in the circumference direction.

In each of the engagement latches 33, an inclined part 35*a* and an inclined part 35*b* are formed. The inclined part 35*a* is formed such that the engagement latch 33 easily bends during the insertion of the shaft part 36 into the attachment hole 24. The inclined part 35*b* is formed such that the engagement latch 33 easily bends during the taking-out of the shaft part 36 from the attachment hole 24. Also, in the lock projection 34, an inclined part 34*a* is formed such that the engagement latch 33 easily bends during the taking-out of the shaft part 36 from the attachment hole 24.

Next, description is given of relationship between a plurality of slats 31 and the air-flow holes 23 of the outer cover 20 when the louver 30 is positioned at the six portions in the circumference direction with respect to the outer cover 20, the plurality of slats 31 being as blades and as oblique members of the louver 30.

In such case, the situation where the reference axis J extending along the linkage part 81 extends in the vertical direction is the reference position of the louver 30.

Figure 12:
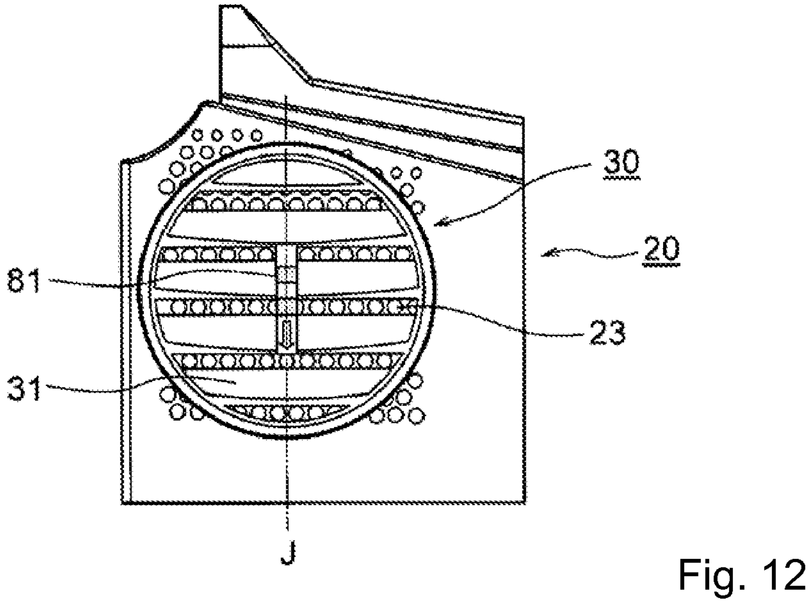
FIG. 12 is a first figure illustrating an attachment state of the louver according to the second embodiment of the present application.
Figure 13:
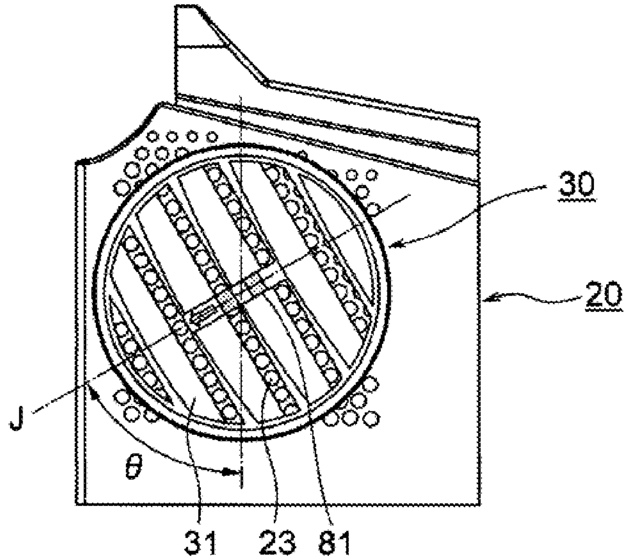
FIG. 13 is a second figure illustrating an attachment state of the louver according to the second embodiment of the present application.
Figure 14:
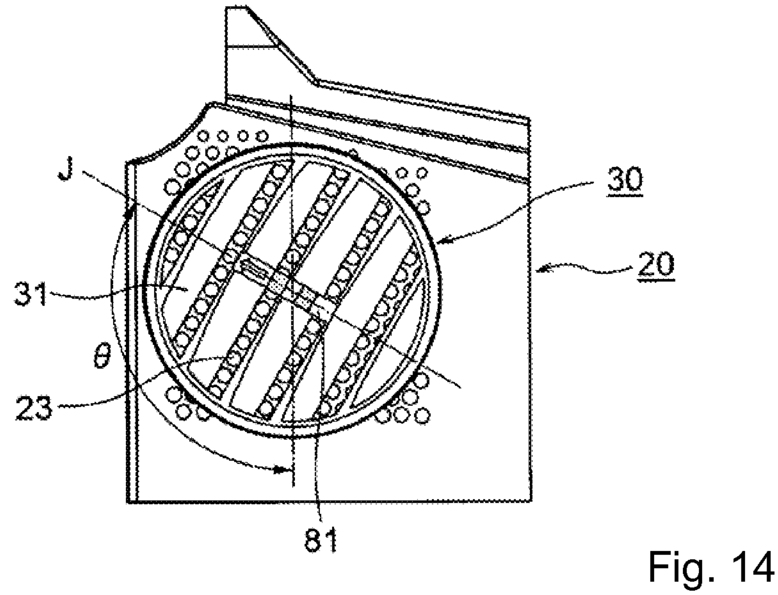
FIG. 14 is a third figure illustrating an attachment state of the louver according to the second embodiment of the present application.
Figure 15:
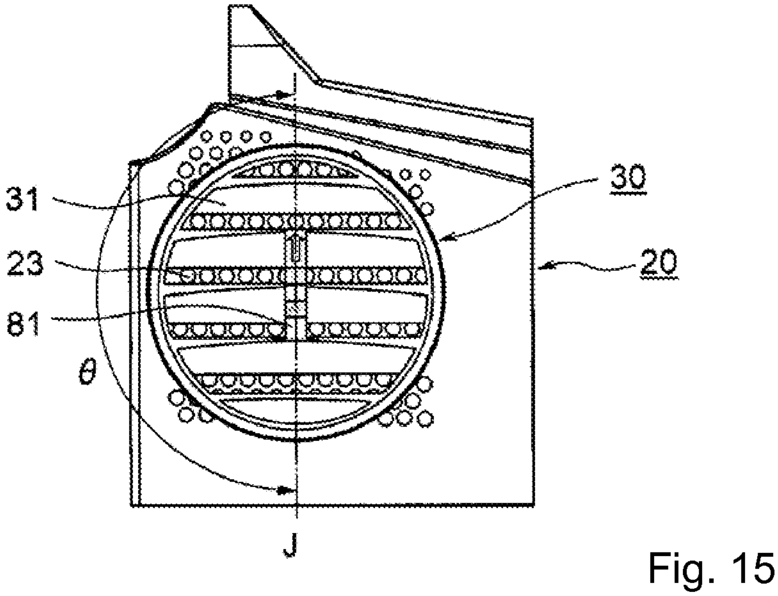
FIG. 15 is a fourth figure illustrating an attachment state of the louver according to the second embodiment of the present application.

FIG. 12 is a first figure illustrating an attachment state of the louver according to the second embodiment of the present application. FIG. 13 is a second figure illustrating an attachment state of the louver according to the second embodiment of the present application. FIG. 14 is a third figure illustrating an attachment state of the louver according to the second embodiment of the present application. FIG. 15 is a fourth figure illustrating an attachment state of the louver according to the second embodiment of the present application.

The figures illustrate the outer cover 20, the louver 30, the slats 31, and the linkage part 81.

The angle formed by the reference axis J and the vertical line is an attachment angle θ of the louver 30. When the attachment angle θ is 0°, the louver 30 is placed in the first attachment state (reference position) as illustrated in FIG. 12. When the attachment angle θ is 60°, the louver 30 is placed in the second attachment state as illustrated in FIG. 13. When the attachment angle θ is 120°, the louver 30 is placed in the third attachment state as illustrated in FIG. 14. When the attachment angle θ is 180°, the louver 30 is placed in the fourth attachment state as illustrated in FIG. 15. Because, when the attachment angle θ is 240° or 300°, the louver 30 is placed in the same attachment state as the case that the attachment angle θ is 120° or 60°, the attachment state being symmetric about the vertical line, the description thereof is omitted.

Then, even when the attachment angle θ is any one of the six angles: 0°, 60°, 120°, 180°, 240°, and 300°, the air-flow holes 23 that can be seen between the slats 31 of the louver 30 extend in rows in parallel to the slats 31. In other words, even when the attachment angle θ is any one of the six angles, the slats 31 of the louver 30 and predetermined sides of the regular hexagon Pi (FIG. 5) are in parallel, and the ventilation mouth parts 37 and the air-flow holes 23 are communicated, the air-flow holes 23 extending in the direction forming a right angle to the reference axis J.

Therefore, even when the attachment angle θ of the louver 30 is any one of the six angles, the ventilation mouth parts 37 and the air-flow holes 23 are efficiently communicated, so that the total area of the air-flow holes 23 (or communicating area) communicated with the ventilation mouth parts 37, that is an aperture ratio of the air-flow holes 23, becomes constant, and the resistance during the blowing-out of air, that is blow-out resistance, does not vary. As a result, the volume of blown-out air is stabilized, and the air that is in the apparatus main body can sufficiently be blown out of the apparatus main body. In other words, wherever the louver 30 is engaged, the communicating areas in which the ventilation mouth parts 37 are communicated to the air-flow holes 23 are the same.

Also, as described above, the air-flow holes 23 are formed symmetrically about the perpendicular bisector R1 of the corresponding side of the regular hexagon Pi, and therefore even when the attachment angle θ of the louver 30 is any one of the six angles, the volume of the blown-out air is the same.

Also, in the present embodiment, the air-flow holes 23 are formed around the attachment hole 24 nearly along sides of the imaginary regular hexagon Pi with the revolving center B as the center, and the lock notches 26 and the lock projections 34 are engaged such that the angle γ and the exterior β2 become substantially the same. Therefore, the aperture ratio of the air-flow holes 23 can be constant.

Even when the attachment angle θ of the louver 30 is any one of the six angles, the air-flow holes 23 that can be seen between the slats 31 always extend in rows. Therefore it is possible to obtain good appearance of the state where the louver 30 is attached to the outer cover 20.

In the present embodiment, the angle β1 formed by two adjacent perpendicular bisectors R1 and the angle γ are substantially the same; however, when the error of the angle β1 generated during the manufacture is within ±10% with respect to the angle γ, the same effect can be obtained.

Also in the present embodiment, the slats 31 of the louver 30 and the predetermined sides of the regular hexagon Pi are in parallel, and the aperture ratio of the air-flow holes 23 are set to be larger. Therefore, even when the error of the pitch d (FIG. 1) of the air-flow holes 23 are large, the volume of blown-out air can be stabilized.

Further, in order to make the aperture ratio of the air-flow holes 23 become constant when the attachment angle θ of the louver 30 varies within the six angles, it is preferred to adjust the variation in the size of the ventilation mouth parts 37 and in the number of the air-flow holes 23 communicated with the ventilation mouth parts 37 at the above-described angles to fall within 20%. More specifically, the number of the ventilation mouth parts 37 is preferably equal to the number of the air-flow holes 23.

Also, upon the manufacture, even when the accurate setting of the pitch d of the air-flow holes 23, the distances Lb and L, etc., and the formation of the air-holes 23 to be precisely symmetric about the perpendicular bisectors R1 are difficult, the volume of blown-out air can be stabilized as long as the variation in the size of the ventilation mouth parts 37 and in the number of the air-flow holes 23 communicated with the ventilation mouth parts 37 at the above-described angles to fall within 20%.

Next, the description of a third embodiment of the present application is given. The elements that have the same structure as the first and second embodiments are assigned with the same reference numbers, and the effects of the application obtained by having the same structure are similar to the effect of the embodiments.

Figure 16:
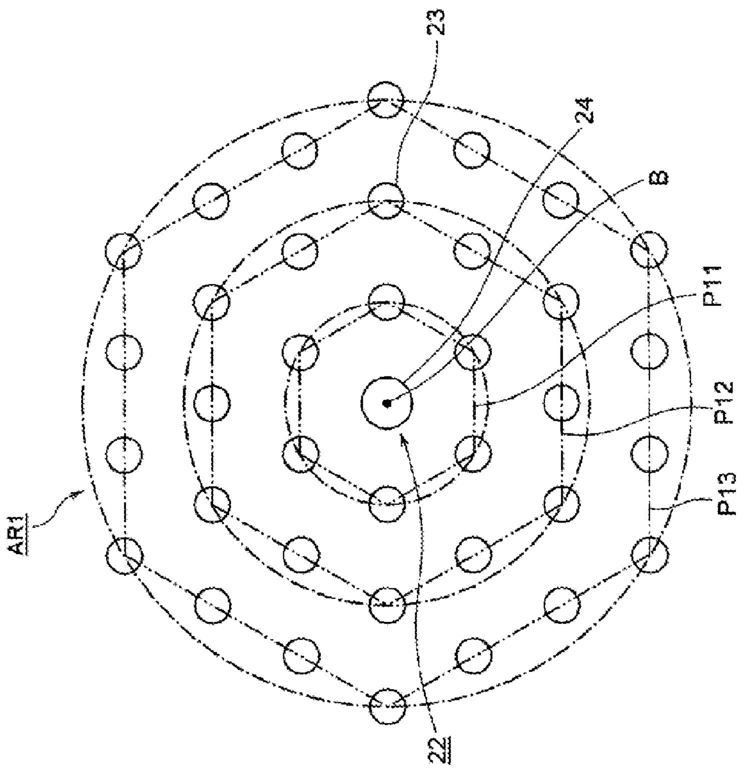
FIG. 16 is an enlarged view of an air-flow region according to a third embodiment of the present application.

FIG. 16 is an enlarged view of an air-flow region according to the third embodiment of the present application.

Here, at the center of the air-flow region AR1 as a ventilation part of the outer cover 20, the attachment part 22 is formed as the first engagement part for positioning the louver 30 as the air-feeding direction change part with respect to the outer cover 20 and attaching the louver 30. The attachment hole 24 is formed in the attachment part 22 in the manner of penetrating through the outer cover 20. The revolving center B is set in the attachment hole 24 for revolvably attaching the louver 30 to the air-flow region AR1.

Also, in order to allow the blown-out air flow through, a plurality of the air-flow holes 23 is formed around the attachment hole 24 in a predetermined pattern in the manner of penetrating through the outer cover 20, the air-flow holes 23 each being as an aperture part having a round shape. The air-flow holes 23 are formed from the vicinity of the attachment hole 24 radially outwardly in the diameter direction along the sides of one or more of imaginary polygons (regular polygons) having the revolving center B as the concentric center. The imaginary polygon in the present embodiment is a regular hexagon Pk (k=11, 12, . . . ), and the air flow holes 23 are formed such that the number of the air flow holes 23 forming each side of each regular hexagons Pk increases by one compared with the number of the air-flow holes 23 forming a side of an inner adjacent regular hexagon Pk. Also, the air-flow holes 23 are placed symmetrically about the perpendicular bisector R1 of the corresponding side of the regular hexagons Pk.

In the first embodiment, the cavity part 25 is formed in the bearing region in which the bearing part 41 of the fan 40 (FIG. 3) as the air-feeding part is formed. However, in the case when the bearing part 41 of the fan 40 is small as in the present embodiment, it is possible to form an air-flow hole 23 instead of the cavity part 25.

Next, the description of a fourth embodiment of the present application is given. The elements that have the same structure as the first-third embodiments are assigned the same reference numbers, and the effects of the application obtained by having the same structure are similar to the effects of the embodiments.

Figure 17:
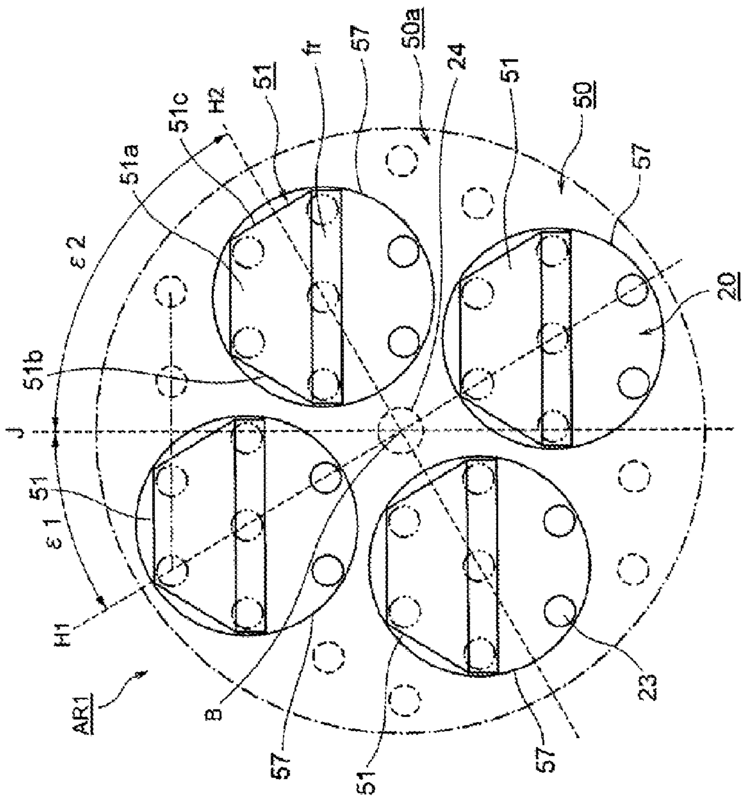
FIG. 17 is a front view of a ventilation device according to a fourth embodiment of the present application.
Figure 18:
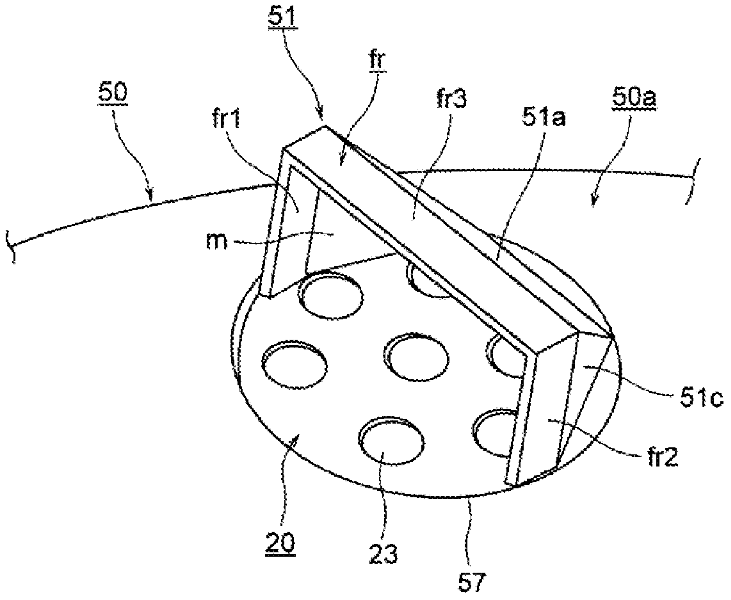
FIG. 18 is a perspective view of a main part of the ventilation device according to the fourth embodiment.

FIG. 17 is a front view of a ventilation device according to the fourth embodiment of the present application. FIG. 18 is a perspective view of a main part of the ventilation device according to the fourth embodiment.

The figures illustrate the ventilation part AR1 as the air-flow region, the outer cover 20, the air-flow holes 23 as apertures, the attachment hole 24, and a louver 50 as an air-feeding direction change part. Note, the revolving center B is set in the attachment hole 24 for revolvably attaching the louver 50.

Then, the louver 50 is removably and revolvably attached to the outer cover 20 such that the blow-out direction of the air that is in the apparatus main body can be changed, the direction being as an air-feeding direction.

The louver 50 has a round shape. The louver 50 is provided with a plate-shape body 50*a* having a predetermined diameter and a predetermined thickness, and a plurality of slats 51 disposed as oblique members in the manner of projecting at several portions (four portions in the present embodiment) of the plate-shape body 50*a*. Then, four ventilation mouth parts 57 are formed, the ventilation mouth parts 57 each having a round shape and penetrating through the plate-shape body 50*a*. The slats 51 are respectively attached to the ventilation mouth parts 57.

Each of the slats 51 is formed in the manner of covering the almost-half portion of the ventilation mouth part 57 and has a U shape with all corners in straight angles. Each of the slats 51 is provided with a frame fr, a top wall 51*a*, and side walls 51*b* and 51*c*. The frame fr is formed with a pair of arm parts fr1 and fr2 and a linkage part fr3, the pair of arm parts fr1 and fr2 formed facing each other and protruding, the linkage part fr3 linking the arm parts fr1 and fr2. The top wall 51*a* is as an oblique member and an inclined member, the oblique member having a trapezoidal shape and extending from the linkage part fr3 toward an obliquely lower portion at a predetermined angle. The side walls 51*b* and 51*c* are triangular-shape and extend respectively from the arm parts fr1 and fr2 toward obliquely side portions.

An opening m is formed by the frame, the opening m being a rectangular shape and for blowing air out. Therefore, the air flowing through the air-flow holes 23 is led to be oblique and flows through the ventilation mouth part 57 in an inclined manner.

When a reference axis J is the axis passing through the rotational axis of the louver 50 and extending in the direction perpendicular to the linkage parts fr3, the reference position of the louver 50 is a state where the reference axis J extends in a vertical direction. Then, when the louver 50 is positioned at the reference position, the centers of two of the ventilation mouth parts 57 out of the ventilation mouth parts 57 is positioned on a line H1 that forms an angle ϵ1 with the reference axis J $$\epsilon 1=30°$$

and the centers of remaining two of the ventilation mouth parts 57 out of the ventilation mouth parts 57 are positioned on a line H2 that forms ϵ2 with the reference axis J $$\epsilon 2=60°.$$

At this time, seven air-flow holes 23 are positioned in each of the ventilation mouth part 57. The seven air-flow holes 23 are the total of an air-flow hole 23 positioned at the center and six air-flow holes 23 positioned adjacent to the air-flow hole 23

In the present embodiment as similar to the second embodiment, when the angle formed by the reference axis J and the vertical line is set as an attachment angle θ of the louver 50, even with any angle of the six attachment angles θ; 0°, 60°, 120°, 180°, 240°, and 300°, the number of the air-flow holes 23 is seven, the air-flow holes 23 communicated with the ventilation mouth part 57 of the louver 50.

Therefore, even when the attachment angle θ of the louver 50 is any angle of the six attachment angles, the ventilation mouth part 57 and the air-flow holes 23 are efficiently communicated, so that an aperture ratio of the air-flow hole becomes constant and blowing resistance when air blows out does not change. As a result, the amount of the blown-out air is stabilized, and the air that is in the apparatus main body can sufficiently be blown out.

As in the present embodiment, even when the ventilation mouth part 57 is formed, the ventilation mouth part 57 having the different form from the ventilation mouth part 37 according to the first through third embodiments, the same effect as the first through third embodiments can be obtained.

Next, the description of a fifth embodiment of the present application is given. Note, the elements that have the same structure as the first through third embodiments are assigned the same reference numbers, and the effects of the application obtained by having the same structure are similar to the effects of the embodiments.

Figure 19:
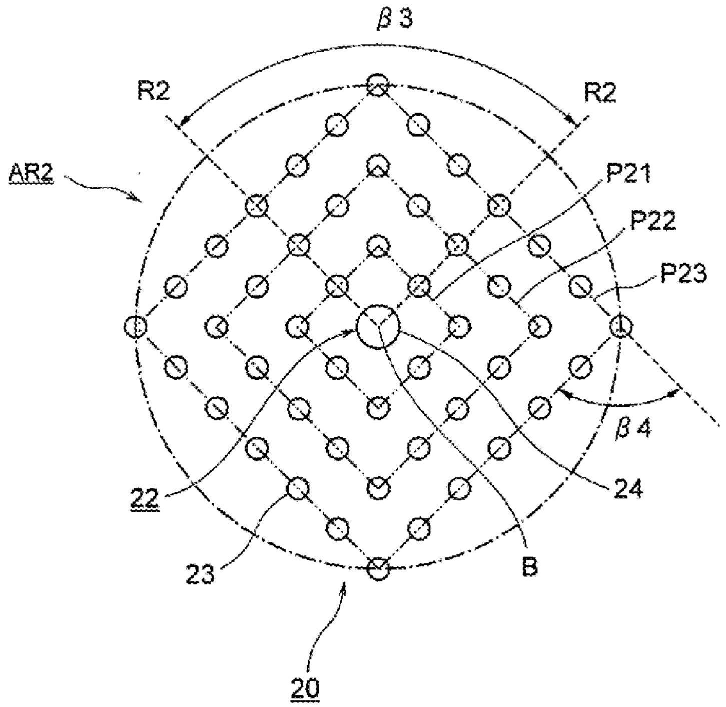
FIG. 19 is an enlarged view of an air-flow region according to a fifth embodiment of the present application.

FIG. 19 is an enlarged view of an air-flow region of the fifth embodiment of the present application.

An air-flow region AR2 is formed in the outer cover 20 for flowing the blown-out air through, the air-flow region AR2 being as a ventilation part having a predetermined shape (a nearly rectangular shape in the present embodiment). At the center of the air-flow region AR2, the attachment part 22 is formed, the attachment part 22 being as the first engagement part for positioning the louver 30 (FIG. 7) with respect to the outer cover 20 and attaching the louver 30 to the outer cover 20. Then, at the attachment part 22, one attachment hole 24 penetrating through the outer cover 20 is formed.

Also, around the attachment hole 24, a plurality of air-flow holes 23 are formed in a predetermined pattern and in the manner of penetrating through the outer cover 20 to allow the blown-out air to flow therethrough, the air-flow holes 23 each being as an aperture part having a round shape. The air-flow holes 23 are formed from the vicinity of the attachment hole 24 radially outwardly in the diameter direction along the sides of one or more of imaginary polygons (regular polygons), the imaginary polygon in the present embodiment being a regular squares Pm, (m=21, 22, . . . ). The air flow holes 23 are formed such that the number of the air flow holes 23 forming each side of each regular squares Pm increases by two compared with the number of the air-flow 23 forming a side of an inner adjacent regular square Pm. Also, the air-flow holes 23 are placed symmetrically about the perpendicular bisector R2 of the corresponding side of the regular squares Pm. Note, an angle β3 formed by two of the adjacent perpendicular bisectors R2 and an exterior angle β4 of the regular square Pm are respectively 90°.

Also, in the louver 30, on the back side of the linkage part 81 as a central base part, the shaft part 36 as the second engagement part is formed by attaching a pair of engagement latches 33 to extrude, and the louver 30 can be removably attached to the outer cover 20 by engaging the engagement latches 33 and the attachment part 22.

Therefore, the engagement latches 33 are respectively formed in a thin tongue shape to have flexibility and in parallel to each other with a predetermined distance therebetween. In the vicinity of tip ends, lock parts 35 are formed to extrude toward the directions of separating from each other. Also, in the attachment part 22, a ring-shape lock part 24*a* is formed to extrude on the back side of the outer cover 20 along the internal circumference of the rim of the attachment hole 24.

Then, on the linkage part 81 side with respect to the lock part 35 in each of the engagement latches 33, the lock projection 34 (FIG. 8) is formed adjacent to the lock part 35 and projected. In a plurality of portions (four portions in the present embodiment) on the interior circumference plane of the engagement part 24*a*, lock notches (not illustrated) are formed at a predetermined pitch in the circumference direction and by a predetermined angle γ'. In such case, the first positioning condition is configured by the lock notches, and the second positioning condition is configured by the lock projection 34.

Note, the angle γ' is set in accordance with the pattern of the air-flow holes 23, and in the present embodiment, the air-flow holes 23 are formed along the sides of the regular square Pm. Therefore, the angle γ' is set as follows:

$$\gamma' = 360/4$$
$$= 90°.$$

In other words, as illustrated in FIG. 19, an exterior angle β4 of the regular square Pm is 90°, so that the angle γ' is set to be substantially the same as the exterior angle β4 of the regular square Pm.

Note, in the present embodiment, the angle β3 formed by two adjacent perpendicular bisectors R2 and the angle γ' are substantially the same; however, when the error of the angle β3 generated during the manufacture is within ±3% with respect to the angle γ', the same effect can be obtained.

In the present embodiment, when the angle formed by the reference axis J and the vertical line is set as an attachment angle θ of the louver 30, even with any angle of the four attachment angles θ; 0°, 90°, 180°, and 270°, the air-flow holes 23 that can be seen through the ventilation mouth part 37 of the louver 30 extend in rows in parallel to the slats 31. In other words, even when the attachment angle θ is any one of the four angles, the slats 31 of the louver 30 and predetermined sides of the regular square Pm are in parallel, and the ventilation mouth parts 37 and the air-flow holes 23 are communicated, the air-flow holes 23 extending in the direction forming a right angle to the reference axis J.

Therefore, even when the attachment angle θ is any angle of the four angles, the ventilation mouth parts 37 and the air-flow holes 23 are efficiently communicated, so that the aperture ratio of the air-flow holes 23 becomes constant and the blow-out resistance during blowing-out of air does not vary. As a result, the volume of blown-out air is stabilized, and the air that is in the apparatus main body can sufficiently be blown out.

In the present embodiment, the air-flow holes 23 are formed around the attachment hole 24 nearly along sides of the imaginary regular square Pm with the revolving center B as the center, and the lock notches and the lock projections 34 are engaged such that the angle γ' and the exterior β4 become substantially the same. Therefore, the aperture ratio of the air-flow holes 23 can be constant.

Next, the description of a sixth embodiment of the present application is given. Note, the elements that have the same structure as the first through third embodiments are assigned with the same reference numbers, and the effects of the application obtained by having the same structure are similar to the effect of the embodiments.

Figure 20:
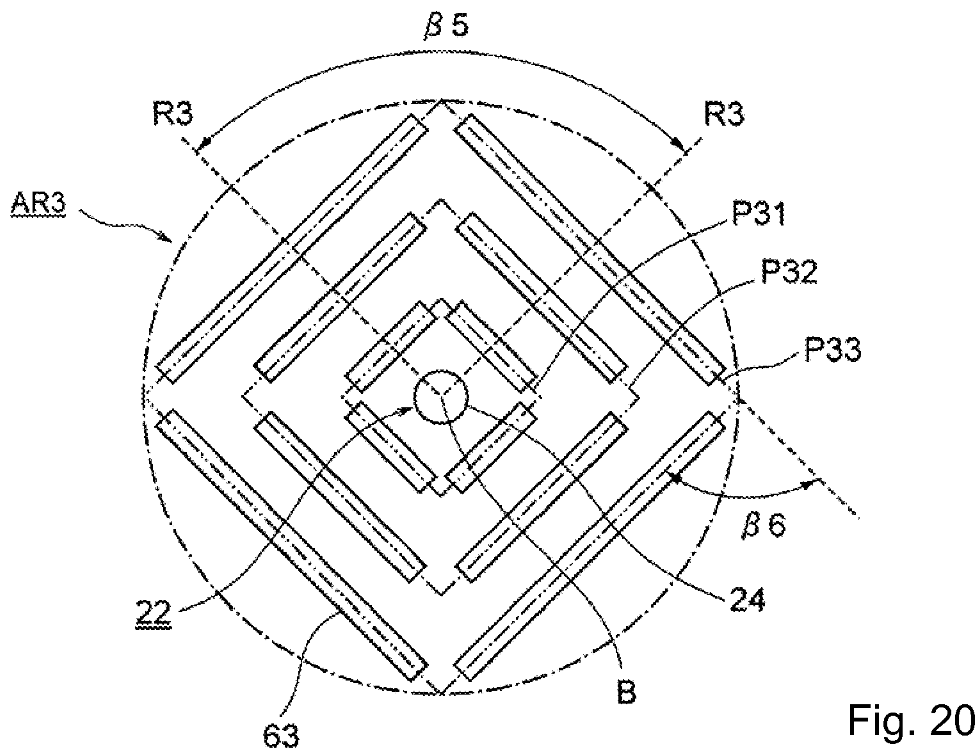
FIG. 20 is an enlarged view of an air-flow region according to a sixth embodiment of the present application.

FIG. 20 is an enlarged view of an air-flow region according to the sixth embodiment of the present application.

An air-flow region AR3 is formed in the outer cover 20 for flowing the blown-out air through, the air-flow region AR3 as a ventilation part having a nearly rectangular shape in the present embodiment. At the center of the air-flow region AR3, the attachment part 22 is formed, the attachment part 22 being as the first engagement part for positioning the louver 30 (FIG. 7) with respect to the outer cover 20 and attaching the louver 30 to the outer cover 20, the louver 30 is the same as the one according to the second embodiment. Then, at the attachment part 22, the attachment hole 24 penetrating through the outer cover 20 is formed.

Also, around the attachment hole 24, a plurality of air-flow holes 63 are formed in a predetermined pattern and in the manner of penetrating through the outer cover 20 to allow the blown-out air to flow therethrough, the air-flow holes 63 each being as an aperture part having a long notch shape. The air-flow holes 63 are formed from the vicinity of the attachment hole 24 radially outwardly in the diameter direction such that sides of one or more of imaginary polygons (regular polygons) are formed, the imaginary polygon in the present embodiment being a regular squares Po, (o=31, 32, . . . ). The air flow holes 63 are formed to become gradually longer, the air flow holes 63 forming the sides of the regular square Po. Also, the air-flow holes 63 are placed symmetrically about the perpendicular bisector R3 of the corresponding side of the regular squares Po. Note, an angle β5 formed by two of the adjacent perpendicular bisectors R3 and an exterior angle β6 of the regular square Po are respectively 90°.

Then, the engagement latches 33 are formed in the louver 30, and on the linkage part 81 side with respect to the lock part 35 in each of the engagement latches 33, the lock projection 34 (FIG. 8) is formed in a projected manner. In a plurality of portions (four portions in the present embodiment) on the interior circumference plane of the engagement part 24*a*, lock notches (not illustrated) are formed at a predetermined pitch in the circumference direction and by a predetermined angle γ'. In such case, the first positioning condition is configured by the lock notches, and the second positioning condition is configured by the lock projection 34.

Note, the angle γ' is set at 90° as the same as the fifth embodiment.

In the present embodiment, when the angle formed by the reference axis J and the vertical line is set as an attachment angle θ of the louver 30, even with any angle of the four attachment angles θ; 0°, 90°, 180°, and 270°, the air-flow holes 63 that can be seen through the ventilation mouth part 37 of the louver 30 extend in parallel to the slats 31, the slats 31 each being as an oblique member. In other words, even when the attachment angle θ is any one of the four angles, the slats 31 of the louver 30 and predetermined sides of the regular square Po are in parallel, and the ventilation mouth parts 37 and the air-flow holes 63 are communicated, the air-flow holes 63 extending in the direction forming a right angle to the reference axis J.

Therefore, even when the attachment angle θ of the louver 30 is any angle of the four angles, the ventilation mouth parts 37 and the air-flow holes 63 are efficiently communicated, so that the aperture ratio of the air-flow holes 63 becomes constant and the blow-out resistance during blowing-out of air does not vary. As a result, the volume of blown-out air is stabilized, and the air that is in the apparatus main body can sufficiently be blown out.

As in the present embodiment, even when the air-flow holes 63 are formed, the air-flow holes 63 having the different form from the air-flow holes 63 according to the first through fifth embodiments, the same effect as the first through fifth embodiments can be obtained.

In the first through fourth embodiments, the imaginary polygons are the regular hexagons Pb and Pk, and in the fifth and sixth embodiments, the imaginary polygons are the regular squares Pm and Po. However, the imaginary polygons can also be set to be a regular triangle, a regular pentagon, a regular heptagon, and a regular polygon which has more than seven angles.

In the embodiments, description of the printer 10 is given; however, it is possible to apply the present application to a copier, a facsimile machine, a multifunction peripheral, and the like.

Aspects of the present application are not limited to the embodiments described above, and various changes and modifications are available based on the purpose of the present application and not eliminated from the scope of the application.

What is claimed is:

1. A ventilation device, comprising:

a ventilation part that includes a first engagement part and that allows air to flow therethrough; and an air-feeding direction change part that includes a second engagement part, that is revolvably attached to the ventilation part by engaging the first engagement part and the second engagement part, and that changes an air-feeding direction in accordance with its revolving, wherein the ventilation part includes an attachment center, a plurality of aperture parts, and a plurality of cavity parts formed around the attachment center, the attachment center being for revolvably attaching the air-feeding direction change part, wherein the cavity parts have a bottom wall and a predetermined depth, the air-feeding direction change part includes an oblique member and a ventilation mouth part, the oblique member being disposed to incline with respect to a rotational axis of the air-feeding direction change part, and the ventilation mouth part communicating with the plurality of aperture parts under a state where the air-feeding direction change part is attached to the ventilation part, the plurality of aperture parts and the plurality of cavity parts of the ventilation part form a plurality of concentric polygons having a common center at the attachment center of the ventilation part at which the air-feeding direction change part is attached, a concentric polygon formed by the plurality of cavity parts having a size smaller than concentric polygons formed by the plurality of aperture parts, a number of the aperture parts forming a first polygon at a farther distance from the center of the polygons is greater than a number of the aperture parts forming a second polygon at a closer distance from the center of the polygons, and the number of aperture parts forming a respective one of the plurality of concentric polygons are separated from the number of aperture parts forming other ones of the plurality of concentric polygons.

2. The ventilation device according to claim 1, wherein the plurality of aperture parts forming the respective one of the plurality of concentric polygons are arranged along sides of that concentric polygon.

3. The ventilation device according to claim 1, wherein the oblique member and the ventilation mouth part respectively extend in parallel to the sides of the plurality of concentric polygons under a state where the air-feeding direction change part is attached to the ventilation part.

4. The ventilation device according to claim 1, wherein the plurality of aperture parts that form the respective one of the plurality of concentric polygons are set at a predetermined pitch.

5. The ventilation device according to claim 1, wherein each of the plurality of concentric polygons is a regular polygon.

6. The ventilation device according to claim 5, wherein the first engagement part and the second engagement part are configured to be engaged at every revolving of a predetermined angle, and the predetermined angle and an exterior angle of the regular polygon are substantially the same.

7. The ventilation device according to claim 6, wherein the predetermined angle is 60°.

8. The ventilation device according to claim 1, wherein most of the plurality of aperture parts are circle.

9. The ventilation device according to claim 1, wherein a distance between two of the plurality of aperture parts that are adjacent is substantially the same as another distance between other two of the plurality of aperture parts that are adjacent.

10. A ventilation device, comprising:

a ventilation part that includes a first engagement part and that allows air to flow therethrough; and an air-feeding direction change part that includes a second engagement part, that is revolvably attached to the ventilation part by engaging the first engagement part and the second engagement part, and that changes an air-feeding direction in accordance with its revolving, wherein the ventilation part includes an attachment center, a plurality of aperture parts, and a plurality of cavity parts formed around the attachment canter, the attachment center being for revolvably attaching the air-feeding direction change part wherein the cavity parts have a bottom wall and a predetermined depth, and the plurality of aperture parts forming air-flow hole rows for allowing air to flow therethrough, horizontal positions of the aperture parts on one of the air-flow hole rows are offset by a predetermined distance from horizontal positions of the aperture parts on another of the air-flow hole rows that is adjacent, and the air-feeding direction change part includes an oblique member and a ventilation mouth part, the oblique member disposed to incline with respect to a rotational axis of the air-feeding direction change part, and the ventilation mouth part communicating with the plurality of aperture parts of the air-flow hole rows under a state where the air-feeding direction change part is attached to the ventilation part, the plurality of aperture parts and a plurality of cavity parts of the ventilation part form a plurality of concentric polygons having a common center at the attachment center of the ventilation part at which the air-feeding direction change part is attached, a concentric polygon formed by the plurality of cavity parts having a size smaller than concentric polygons formed by the plurality of aperture parts, a number of the aperture parts forming a first polygon at a farther distance from the center of the polygons is greater than a number of the aperture parts forming a second polygon at a closer distance from the center of the polygons, and the number of aperture parts forming a respective one of the plurality of concentric polygons are separated from the number of aperture parts forming other ones of the plurality of concentric polygons.

11. The ventilation device according to claim 10, wherein the first engagement part and the second engagement part are configured to be engaged at every revolving of a predetermined angle, the plurality of aperture parts are arrayed at a predetermined pitch in the air-flow hole rows, and the horizontal positions of the aperture parts on one of the air-flow hole rows are offset by a half of the predetermined pitch from the horizontal positions of the aperture parts on the another adjacent air-flow hole row.

12. The ventilation device according to claim 10, wherein the plurality of aperture parts on the air-flow hole rows forming the respective one of the plurality of concentric polygons are arranged along sides of that concentric polygon.

13. The ventilation device according to claim 10, wherein each of the plurality of concentric polygons is a regular polygon.

14. The ventilation device according to claim 13, wherein the first engagement part and the second engagement part are configured to be engaged at every revolving of a predetermined angle, and the predetermined angle and an exterior angle of the regular polygon are substantially the same.

15. The ventilation device according to claim 14, wherein the predetermined angle is 60°.

16. The ventilation device according to claim 1, wherein the attachment center is an attachment hole and includes the first engagement part, the attachment hole formed in the manner of penetrating through the ventilation part for attaching the air-feeding direction change part to the ventilation part.

17. The ventilation device according to claim 1, wherein the plurality of cavity parts are closed holes formed to prevent incorrect attachment of the air-feeding direction change part to the ventilation part.

18. The ventilation device according to claim 1, wherein an air-feeding part is disposed facing the ventilation part.

19. The ventilation device according to claim 1, wherein the air-feeding direction change part is attached removably to the ventilation part.

20. An image forming apparatus, comprising:

an image forming unit that forms an image on a medium;

the ventilation device according to claim 1.

21. An information processing apparatus, comprising:

a processing unit that processes data; and the ventilation device according to claim 10.

22. The ventilation device according to claim 1, wherein the air-feeding direction change part is configured to be engaged to the ventilation part at every revolving of a predetermined angle, and the ventilation part is formed such that communication areas of the ventilation part and the ventilation mouth part are equal at any positions where the air-feeding direction change part is engaged to the ventilation part.

23. The ventilation device according to claim 1, wherein the air-feeding direction change part is configured to be engaged to the ventilation part at every revolving of a predetermined angle, and the ventilation part is formed such that the numbers of the aperture parts communicating the ventilation mouth parts are equal at any positions where the air-feeding direction change part is engaged to the ventilation part.

24. The ventilation device according to claim 1, wherein the air-feeding direction change part includes a plurality of oblique parts, and a plurality of ventilation mouth parts formed between two adjacent oblique parts, and the air-feeding direction change part is rotatable so that each ventilation mouth part is aligned with a set of the plurality of the aperture parts that are linearly aligned in a predetermined direction.

25. The ventilation device according to claim 10, wherein the air-feeding direction change part includes a plurality of oblique parts, and a plurality of ventilation mouth parts formed between two adjacent oblique parts, and the air-feeding direction change part is rotatable so that each ventilation mouth part is aligned with a set of the plurality of the aperture parts that are linearly aligned in a predetermined direction.

26. The ventilation device according to claim 1, further comprising:

a fan that is attached to the ventilation part and that rotates to generate the air flow, the fan including a bearing having an outer diameter, wherein a center of the bearing is disposed at a position corresponding to a position of the attachment center, and each of the plurality of cavity parts is formed within a distance from the attachment center that is equal to or less than a half of the outer diameter of the bearing.

27. The ventilation device according to claim 10, wherein a fan that is attached to the ventilation part and that rotates to generate the air flow, the fan including a bearing having an outer diameter, wherein a center of the bearing is disposed at a position corresponding to a position of the attachment center, and each of the plurality of cavity parts is formed within a distance from the attachment center that is equal to or less than a half of the outer diameter of the bearing.

28. The ventilation device according to claim 1, wherein the ventilation mouth part of the air-feeding direction change part includes an air intake side opening, through which the air flow through the ventilation part is taken in, and an air output side opening, through which the air taken in through the air intake side opening is outputted, and the oblique member of the air-feeding direction change part extends from the air intake side opening to the air output side opening.

29. The ventilation device according to claim 10, wherein the ventilation mouth part of the air-feeding direction change part includes an air intake side opening, through which the air flow through the ventilation part is taken in, and an air output side opening, through which the air taken in through the air intake side opening is outputted, and the oblique member of the air-feeding direction change part extends from the air intake side opening to the air output side opening.

* * * * *